(12) United States Patent
Jeong

(10) Patent No.: US 11,455,703 B2
(45) Date of Patent: Sep. 27, 2022

(54) SEMICONDUCTOR DEVICE AND SEMICONDUCTOR SYSTEM INCLUDING THE SAME

(71) Applicant: SK hynix Inc., Gyeonggi-do (KR)

(72) Inventor: Chun Seok Jeong, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 69 days.

(21) Appl. No.: 16/769,877

(22) PCT Filed: Jun. 14, 2018

(86) PCT No.: PCT/KR2018/006692
§ 371 (c)(1),
(2) Date: Jun. 4, 2020

(87) PCT Pub. No.: WO2019/088390
PCT Pub. Date: May 9, 2019

(65) Prior Publication Data
US 2021/0183006 A1    Jun. 17, 2021

(30) Foreign Application Priority Data

Nov. 6, 2017 (KR) .................. 10-2017-0146481

(51) Int. Cl.
*G06T 1/20* (2006.01)
*G06F 13/38* (2006.01)
*G06T 1/60* (2006.01)

(52) U.S. Cl.
CPC .............. *G06T 1/20* (2013.01); *G06F 13/38* (2013.01); *G06T 1/60* (2013.01)

(58) Field of Classification Search
CPC .............. G06T 1/20; G06T 1/60; G06F 13/38
See application file for complete search history.

(56) References Cited

U.S. PATENT DOCUMENTS

2002/0126661 A1    9/2002  Ngai
2005/0283544 A1*  12/2005  Yee .................. G06F 13/28
                                                      710/35
(Continued)

FOREIGN PATENT DOCUMENTS

KR    10-2004-0106300 A    12/2004
KR    10-1150928 B1         5/2012
(Continued)

OTHER PUBLICATIONS

Justanswer ("Last round of questions", 2012, https://www.justanswer.com/computer-hardware/6nt61-last-round-questions-1-answer-following-questions.html) (Year: 2012).*

(Continued)

*Primary Examiner* — Xin Sheng
(74) *Attorney, Agent, or Firm* — IP & T Group LLP

(57) ABSTRACT

In accordance with an embodiment of the present disclosure, a semiconductor system includes a first semiconductor device coupled to a first transmission line, and configured to transmit a first packet to a second transmission line on the basis of first destination information of the first packet received through the first transmission line; a second semiconductor device coupled to the first semiconductor device through the second transmission line, and configured to transmit a second packet to a third transmission line on the basis of second destination information of the second packet received through the second transmission line; and a third semiconductor device coupled to the second semiconductor device through the third transmission line, coupled to the first semiconductor device through the first transmission line, and configured to transmit a third packet to the first transmission line on the basis of third destination information of the third packet received through the third transmission line.

10 Claims, 16 Drawing Sheets

(56) References Cited

U.S. PATENT DOCUMENTS

| | | | |
|---|---|---|---|
| 2007/0280141 A1* | 12/2007 | Sachidanandam | H04L 12/433 370/254 |
| 2008/0140900 A1* | 6/2008 | Mysliwitz | G11C 5/04 710/301 |
| 2010/0020798 A1 | 1/2010 | Jones | |
| 2012/0047298 A1 | 2/2012 | Inoue et al. | |
| 2012/0297392 A1* | 11/2012 | Hara | H04L 12/4637 718/102 |
| 2016/0217549 A1 | 7/2016 | Chen et al. | |
| 2017/0103494 A1 | 4/2017 | Deering et al. | |
| 2017/0206024 A1* | 7/2017 | Rezaei | G06F 3/0611 |
| 2017/0220508 A1 | 8/2017 | Kaviani et al. | |
| 2017/0358132 A1* | 12/2017 | Munshi | G06T 15/80 |

FOREIGN PATENT DOCUMENTS

| | | |
|---|---|---|
| KR | 10-1543671 B1 | 8/2015 |
| KR | 10-2017-0083366 A | 7/2017 |
| WO | 2007-093218 A1 | 8/2007 |

OTHER PUBLICATIONS

Extended European Search Report issued by European Patent Office dated Jun. 30, 2021.

* cited by examiner

SEMICONDUCTOR DEVICE AND SEMICONDUCTOR SYSTEM INCLUDING THE SAME

CROSS-REFERENCE TO RELATED APPLICATION

This application is a national stage application of PCT/KR2018/006692 filed on Jun. 14, 2018, which claims priority of Korean patent application number 10-2017-0146481 filed on Nov. 6, 2017. The disclosure of each of the foregoing applications is incorporated herein by reference in its entirety.

TECHNICAL FIELD

Embodiments of the present disclosure relate to a semiconductor device and a semiconductor system including the same.

BACKGROUND ART

In recent times, with rapid development of various technologies, for example, autonomous driving, big data processing, artificial intelligence, etc., much more information needs to be simultaneously processed. Specifically, in order to recognize peripheral environmental information in an autonomous driving technology, many cameras need to be installed at many spots. In order to process image data received from the cameras as well as to provide not only direct/indirect information related to vehicle driving but also entertainment information to a vehicle driver, much more information must be processed at once. For this purpose, many developers and companies are conducting intensive research into technology for improving processing performances of various processors, for example, a Central Processing Unit (CPU), a Graphics Processing Unit (GPU), an Image Signal Processor (ISP), and a Display Signal Processor (DSP), while simultaneously increasing memory storage capacity. However, the increasing of processing performance or memory storage capacity is not easy and has disadvantages in terms of production costs, such that technology capable of using a plurality of processors or a plurality of memories has been widely used to perform respective functions.

DISCLOSURE

Technical Problem

Various embodiments of the present disclosure are directed to providing a semiconductor device and a semiconductor system including the same that substantially obviate one or more problems due to limitations and disadvantages of the related art.

The embodiment of the present disclosure relates to a semiconductor system capable of easily increasing the number of semiconductor devices such as processors or memories.

Technical Solution

In accordance with an embodiment of the present disclosure, a semiconductor system includes: a first semiconductor device coupled to a first transmission line, and configured to transmit a first packet to a second transmission line on the basis of first destination information of the first packet received through the first transmission line; a second semiconductor device coupled to the first semiconductor device through the second transmission line, and configured to transmit a second packet to a third transmission line on the basis of second destination information of the second packet received through the second transmission line; and a third semiconductor device coupled to the second semiconductor device through the third transmission line, coupled to the first semiconductor device through the first transmission line, and configured to transmit a third packet to the first transmission line on the basis of third destination information of the third packet received through the third transmission line.

In accordance with another embodiment of the present disclosure, a semiconductor device includes: a receiver configured to receive a packet; a packet generation circuit configured to generate an internal packet having internal destination information and internal data; a packet selection circuit configured to transmit any one of the received packet and the internal packet; and a destination decision circuit configured to transmit the received packet to the packet selection circuit on the basis of destination information of the received packet.

In accordance with still another embodiment of the present disclosure, a semiconductor system including a plurality of semiconductor devices coupled to a loop-shaped transmission line, the semiconductor system includes each of the plurality of semiconductor devices. Each semiconductor device includes a data processor; a destination decision circuit configured to transmit the received packet to the data processor on the basis of destination information of the received packet; an internal packet generation circuit configured to generate an internal packet using internal data; and a transmission circuit configured to transmit the internal packet to the loop-shaped transmission line.

It is to be understood that both the foregoing general description and the following detailed description of the present disclosure are exemplary and explanatory and are intended to provide further explanation of the invention as claimed.

Advantageous Effects

As is apparent from the above description, the embodiments of the present disclosure may easily increase the number of semiconductor devices contained in the semiconductor system, resulting in increase extensibility.

DESCRIPTION DRAWINGS

The above and other features and advantages of the present disclosure will become readily apparent by reference to the following detailed description when considered in conjunction with the accompanying drawings wherein.

BEST MODE

In accordance with an embodiment of the present disclosure, a semiconductor system includes: a first semiconductor device coupled to a first transmission line, and configured to transmit a first packet to a second transmission line on the basis of first destination information of the first packet received through the first transmission line; a second semiconductor device coupled to the first semiconductor device through the second transmission line, and configured to transmit a second packet to a third transmission line on the basis of second destination information of the second packet received through the second transmission line; and a third semiconductor device coupled to the second semiconductor device through the third transmission line, coupled to the first semiconductor device through the first transmission line, and configured to transmit a third packet to the first transmission line on the basis of third destination information of the third packet received through the third transmission line.

Mode of the Invention

Reference will now be made in detail to the embodiments of the present disclosure, examples of which are illustrated in the accompanying drawings. Wherever possible, the same reference numbers will be used throughout the drawings to refer to the same or like parts.

Figure 1:
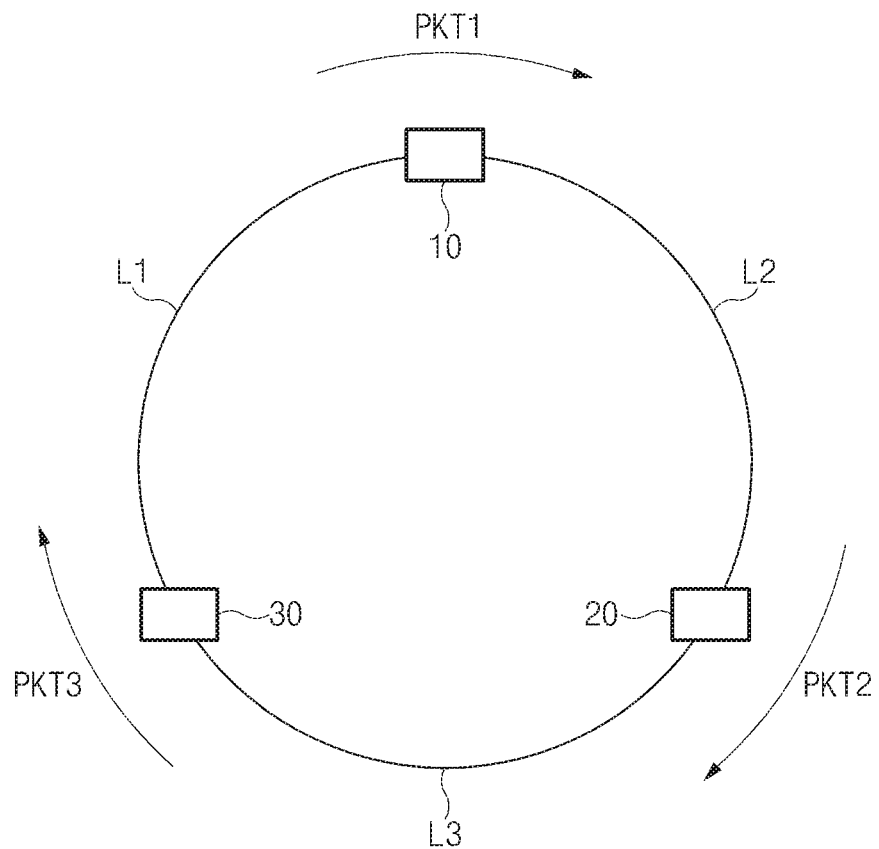
FIG. 1 is a conceptual diagram illustrating a representation of an example of a semiconductor system according to an embodiment of the present disclosure.

FIG. 1 is a conceptual diagram illustrating a representation of an example of a semiconductor system according to an embodiment of the present disclosure.

Referring to FIG. 1, the semiconductor system may include first to third transmission lines L1, L2, and L3, and first to third semiconductor devices 10, 20, and 30. The first to third semiconductor devices 10, 20, and 30 may be interconnected to form a loop shape through the first to third transmission lines L1, L2, and L3. In more detail, the third semiconductor device 30 may be coupled to the first semiconductor device 10 through the first transmission line L1, the first semiconductor device 10 may be coupled to the second semiconductor device 20 through the second transmission line L2, and the semiconductor device 20 may be coupled to the third semiconductor device 30 through the third transmission line L3.

The first semiconductor device 10 may transmit a first packet (PKT1) to the second transmission line L2 on the basis of first destination information of the first packet (PKT1) received through the first transmission line L1.

When the first destination information of the first packet (PKT1) is identical to an identifier (ID) of the first semiconductor device 10, the first semiconductor device 10 may transmit the first packet (PKT1) to a data processor contained in the first semiconductor device 10. The data processor may process the first packet (PKT1). When the first destination information of the first packet (PKT1) is not identical to the ID of the first semiconductor device 10, the first semiconductor device 10 may transmit the first packet (PKT1) to the second transmission line L2.

The second semiconductor device 20 may transmit a second packet (PKT2) to the third transmission line L3 on the basis of second destination information of the second packet (PKT2) received through the second transmission line L2. When the second destination information of the second packet (PKT2) is identical to an identifier (ID) of the second semiconductor device 20, the second semiconductor device 20 may transmit the second packet (PKT2) to a data processor contained in the second semiconductor device 20. The data processor may process the second packet (PKT2). When the second destination information of the second packet (PKT2) is not identical to the ID of the second semiconductor device 20, the second semiconductor device 20 may transmit the second packet (PKT2) to the third transmission line L3.

The third semiconductor device 30 may transmit a first packet (PKT3) to the first transmission line L1 on the basis of third destination information of the third packet (PKT3) received through the third transmission line L3. When the third destination information of the third packet (PKT3) is identical to an identifier (ID) of the third semiconductor device 30, the third semiconductor device 30 may transmit the third packet (PKT3) to a data processor contained in the third semiconductor device 30. The data processor may process the third packet (PKT3). When the third destination information of the third packet (PKT3) is not identical to the ID of the third semiconductor device 30, the third semiconductor device 30 may transmit the third packet (PKT3) to the first transmission line L1.

The ID of the first semiconductor device 10, the ID of the second semiconductor device 20, and the ID of the third semiconductor device 30 may be different from one another.

In accordance with one embodiment, the first packet (PKT1) may be processed in the first semiconductor device 10, or may be transmitted to the second semiconductor device 20. In addition, the first packet (PKT1) transmitted to the second semiconductor device 20 may be processed in the second semiconductor device 20, or may be transmitted to the third semiconductor device 30. That is, the first packet (PKT1) received from the transmission line L1 may be transmitted to any one of the first semiconductor device 10, the second semiconductor device 20, and the third semiconductor device 30.

Likewise, the second packet (PKT2) received from the second transmission line L2 may be transmitted to any one of the second semiconductor device 20, the third semiconductor device 30, and the first semiconductor device 10. In addition, the third packet (PKT3) received from the third transmission line L3 may be transmitted to any one of the third semiconductor device 30, the first semiconductor device 10, and the second semiconductor device 20.

Figure 2:
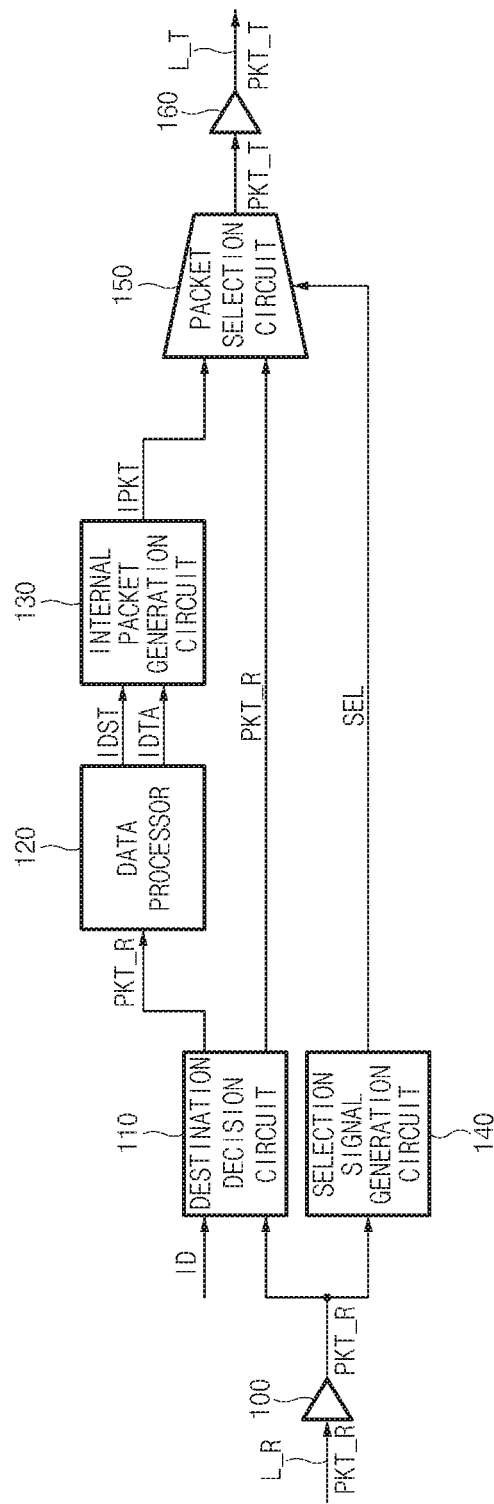
FIG. 2 is a block diagram illustrating a representation of an example of a semiconductor device according to an embodiment of the present disclosure.

FIG. 2 is a block diagram illustrating a representation of an example of a semiconductor device according to an embodiment of the present disclosure.

The semiconductor device may correspond to any one of the first to third semiconductor devices 10, 20, and 30 shown in FIG. 1. In the case of using the first semiconductor device 10 of FIG. 1, a reception-end transmission line L_R may correspond to the first transmission line L1. In the case of using the second semiconductor device 20 of FIG. 1, a reception-end transmission line L_R may correspond to the second transmission line L2. In the case of using the third semiconductor device 30 of FIG. 1, a reception-end transmission line L_R may correspond to the third transmission line L3. In the case of using the first semiconductor device 10 of FIG. 1, a transmission-end transmission line L_T may correspond to the second transmission line L2. In the case of using the second semiconductor device 20 of FIG. 1, a transmission-end transmission line L_T may correspond to the third transmission line L3. In the case of using the third semiconductor device 30 of FIG. 1, a transmission-end transmission line L_T may correspond to the first transmission line L1.

Referring to FIG. 2, the semiconductor device may include a receiver 100, a destination decision circuit 110, a data processor 120, an internal packet generation circuit 130, a selection signal generation circuit 140, a packet selection circuit 150, and a transmitter 160.

The receiver 100 may receive a packet (PKT_R) through the transmission line L_R.

The destination decision circuit 110 may compare destination information of the packet (PKT_R) with ID information of the semiconductor device 2, and may transmit the packet (PKT_R) to the data processor 120 or the packet selection circuit 150 on the basis of the result of comparison. In accordance with one embodiment, when the destination information of the packet (PKT_R) is identical to the ID information of the semiconductor device 2, the destination decision circuit 110 may transmit the packet (PKT_R) to the data processor 120. When the destination information of the packet (PKT_R) is not identical to the ID information of the semiconductor device 2, the destination decision circuit 110 may transmit the packet (PKT_R) to the packet selection circuit 150.

The data processor 120 may process the packet (PKT_R) received from the destination decision circuit 110.

The internal packet generation circuit 130 may generate an internal packet (IPKT). The internal packet (IPKT) may include data (IDTA) and a header having destination information (IDST). In accordance with one embodiment, the destination information (IDST) contained in the internal packet (IPKT) and the data (IDTA) may be received from the data processor 120. The destination information (IDST) and the data (IDTA) may be generated on the basis of the processed result of the packet (PKT_R), and may also be generated irrespective of the packet (PKT_R).

The selection signal generation circuit 140 may activate a selection signal (SEL) upon receiving a packet (PKT_R). The selection signal generation circuit 140 may deactivate the selection signal (SEL) when the packet (PKT_R) is not received.

The packet selection circuit 150 may select any one of the packet (PKT_R) and the internal packet (IPKT), and may transmit the selected packet (PKT_T) to the transmission line (L_T). In accordance with one embodiment, the packet selection circuit 150 may select the packet (PKT_R) when the selection signal (SEL) is activated. In addition, the packet selection circuit 150 may select the internal packet (IPKT) when the selection signal (SEL) is deactivated.

The transmitter 160 may output the selected packet (PKT_T) to the transmission line (L_T).

Figure 3:
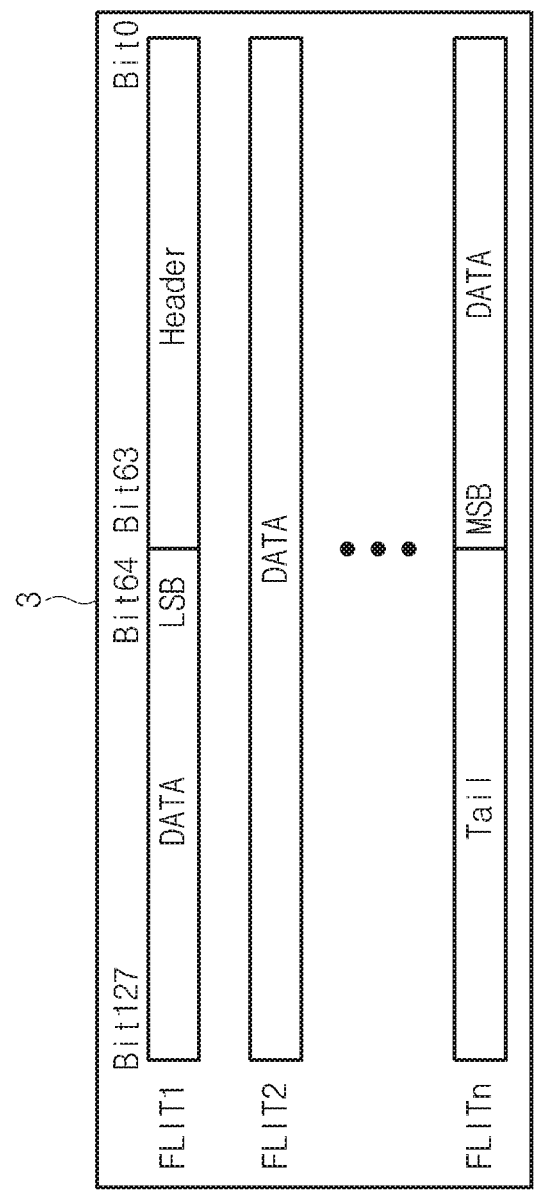
FIG. 3 is a block diagram illustrating a representation of an example of a packet according to an embodiment of the present disclosure.

FIG. 3 is a block diagram illustrating a representation of an example of a packet 3 according to an embodiment of the present disclosure.

The packet 3 in FIG. 3 may correspond to at least one of a first packet (PKT1), a second packet (PKT2), and a third packet (PKT3) illustrated in FIG. 1, or may correspond to at least one of the packet (PKT_R), the internal packet (IPKT), and the selected packet (PKT_T) illustrated in FIG. 2.

Referring to FIG. 3, the packet 3 may include a plurality of flits (FLIT1~FLITn). Each of the respective flits (FLIT1~FLITn) may be a bitstream having a predetermined length (the number of bits, for example, 128 bits). The first flit (FLIT1) may include a header region, and the last flit (FLITn) may include a tail region. Each of destination information and source information may be included in at least one of the header region and the tail region.

Data (DATA) may be included in the remaining part other than the header region and the tail region of each of the flits FLIT1 to FLITn. Data (DATA) may sequentially include the range from the next part (i.e., 65-th bit (Bit64) of the first flit (FLIT1)) of the header region to a previous part (i.e., 64-th bit (Bit63) of the last flit (FLITn)) of the tail region. That is, the 65-th bit (Bit64) of the first flit (FLIT1) may include a Least Significant Bit (LSB), and the 64-th bit (Bit63) of the last flit (FLITn) may include a Most Significant Bit (MSB).

Although the packet 3 of FIG. 3 includes a plurality of flits FLIT1 to FLITn for convenience of description, the packet 3 may also include only one flit as necessary. In this case, only one flit includes a header, data (DATA), and a tail.

Although the header of FIG. 3 is composed of 64 bits and the tail of FIG. 3 is composed of 64 bits for convenience of description, it should be noted that the number of bits contained in the header and the number of bits contained in the tail are not limited thereto.

FIGS. 4 to 8 are schematic diagrams illustrating representations of examples of semiconductor systems according to an embodiment of the present disclosure.

In each of FIGS. 4 to 8, only one transmission line La, Lb, Lc, Ld, or Le is illustrated for convenience of description and better understanding of the present disclosure. However, the scope or spirit of the present disclosure is not limited thereto, each of the transmission lines (La~Le) shown in FIGS. 4 to 8 may denote a data transmission direction. Each of the transmission lines (La~Le) may include a plurality of segments to interconnect a plurality of devices in the form of a loop as shown in FIG. 1.

Figure 4:
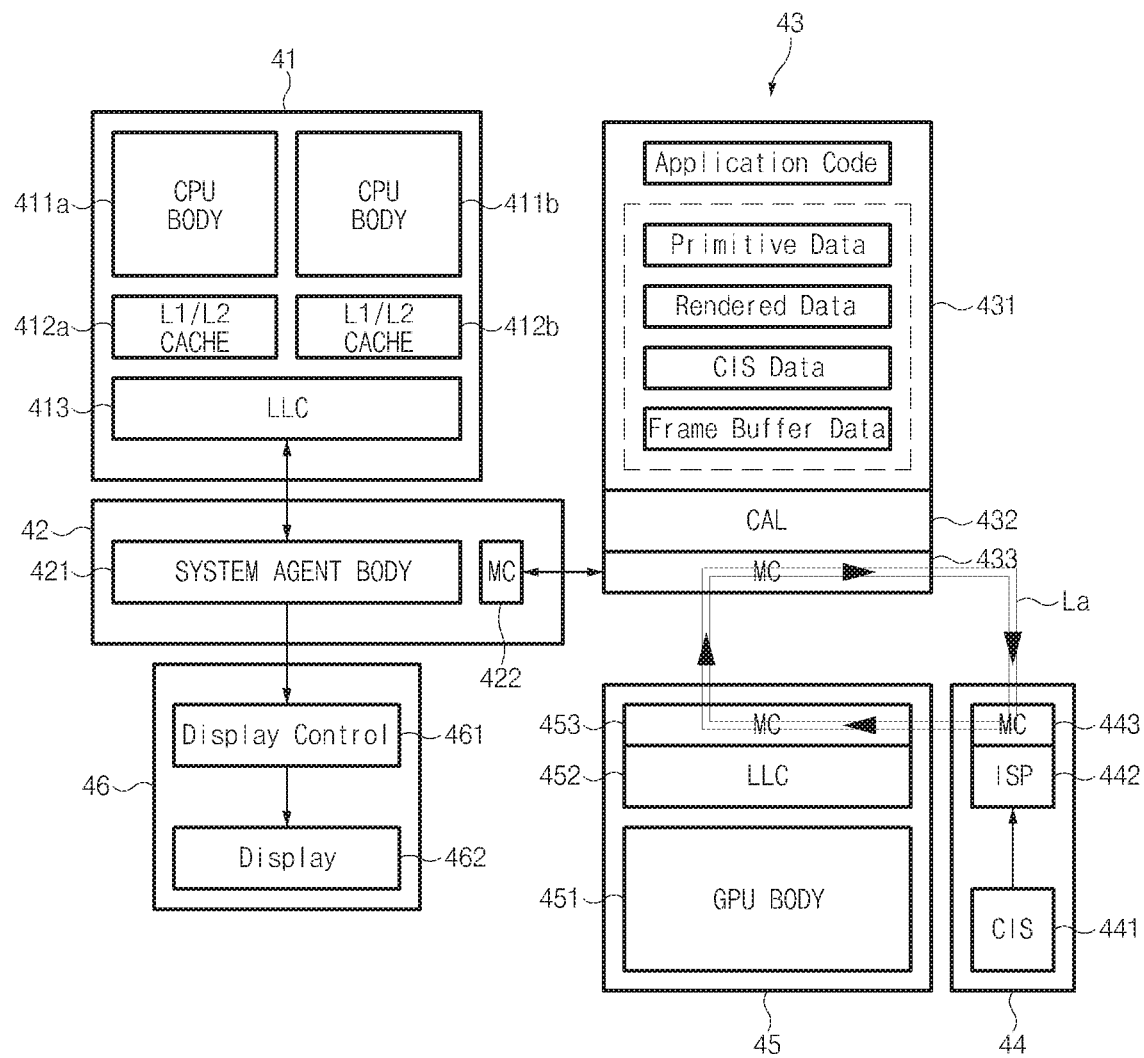
FIGS. 4 to 8 are schematic diagrams illustrating representation of examples of semiconductor devices according to an embodiment of the present disclosure.

Referring to FIG. 4, a semiconductor system may include a CPU 41, a system agent 42, a system memory 43, an image input device 44, a GPU 45, and an image output device 46. In FIG. 4, the first semiconductor device 10 of FIG. 1 may correspond to the system memory 43, the second semiconductor device 20 of FIG. 1 may correspond to the image input device 44, and the third semiconductor device 30 of FIG. 1 may correspond to the GPU 45.

The CPU 41 may include CPU bodies 411a and 411b, L1/L2 caches 412a and 412b, and a Last Level Cache (LLC) 413. The CPU bodies 411a and 411b may perform system calculation and calculation scheduling. The L1/L2 caches 412a and 412b may be respectively coupled to the CPU bodies 411a and 411b, may store temporary data generated in the calculation process of the CPU bodies 411a and 411b, may receive a command and data needed for such calculation from the system memory 44, and may store the received command and data. The LLC 413 may be a cache memory that has lower operation speed and larger capacity as compared to the L1/L2 caches 412a and 412b. The LLC 413 may be coupled to the L1/L2 caches 412a and 412b, and may store data needed for calculation of the CPU bodies 411a and 411b.

Although the embodiment has exemplarily disclosed that two CPU bodies 411a and 411b correspond to two L1/L2 caches 412a and 412b for convenience of description, the scope or spirit of the present disclosure is not limited thereto, and it should be noted that a smaller or higher number of L1/L2 caches may correspond to the CPU bodies as necessary.

The system agent 42 may be coupled to the CPU 41, the system memory 43, and the image output device 46, and may control data communication among the CPU 41, the system memory 44, and the image output device 46. The system agent 42 may include a system agent body 421 and a memory controller (MC) 422. The memory controller (MC) 422 may control data transmission/reception when transmitting/receiving data to/from the system memory 43.

The system memory 43 may correspond to the first semiconductor device 10 of FIG. 1, may be coupled to the memory controller (MC) 422 of the system agent 42, and may be coupled to the image input device 44 and the GPU 45 in the form of a loop shape. The system memory 43 may include a data storage region 431, a calculation logic circuit 432, and a memory controller 433. The system memory 43 may be implemented as a DRAM. The data storage region 431 may store an application code for system calculation, primitive data for image processing in the GPU 45, rendered data, CMOS Image Sensor (CIS) data, and frame buffer data. A calculation logic circuit (CAL) 432 may perform calculation (e.g., data compression) of input data received through the memory controller (MC) 433, and may store the calculation result in the storage region 431. The memory controller (MC) 433 may receive data from the memory controller (MC) 422 of the system agent 42, may transmit the received data to the CAL 432, and may store the resultant data in the data storage region 431. In addition, the memory controller (MC) 433 may receive packet-shaped data from the memory controller (MC) 453 of the GPU 45, and may transmit the received data to the image input device 44 according to destination information contained in the packet. The memory controller (MC) 433 may include a receiver 100, a destination decision circuit 110, an internal packet generation circuit 130, a selection signal generation circuit 140, a packet selection circuit 150, and a transmitter 160 as illustrated in FIG. 2. The CAL 432 and/or the data storage region 431 may correspond to the data processor 120 of FIG. 2.

The image input device 44 may correspond to the second semiconductor device 20 of FIG. 1, may receive image data from the external part, and may output the received image data in the form of digital data. The image input device 44 may include a CIS (CMOS Image Sensor) 441, an Image Signal Processor (ISP) 442, and a memory controller (MC) 443. The memory controller (MC) 443 may receive packet-shaped data from the memory controller (MC) 433 of the system memory 43, and may transmit the received packet data to the GPU 45 according to destination information contained in the packet. The memory controller (MC) 443 may include a receiver 100, a destination decision circuit 110, an internal packet generation circuit 130, a selection signal generation circuit 140, a packet selection circuit 150, and a transmitter 160 illustrated in FIG. 2. The ISP 442 may correspond to the data processor 120 of FIG. 2.

The GPU 45 may correspond to the third semiconductor device 30 of FIG. 1, and may be a calculation device specialized for image data processing. The GPU 45 may include a GPU body 451, an LLC 452, and a memory controller (MC) 453. The memory controller 453 may receive packet-shaped data from the memory controller 443 of the image input device 44, and may transmit the received packet data to the memory controller (MC) 433 of the system memory 43 according to destination information contained in the packet. The memory controller 453 may include a receiver 100, a destination decision circuit 110, an internal packet generation circuit 130, a selection signal generation circuit 140, a packet selection circuit 150, and a transmitter 160 illustrated in FIG. 2. The GPU body 451 and/or the LLC 452 may correspond to the data processor 120 of FIG. 2.

The image output device 46 may include a display controller 461 and a display device 462. The display controller 461 may be coupled to the system agent 42, may receive frame buffer data from the system memory 43 through the system agent 42, and may display the received frame buffer data on the display device 462.

The operations of the semiconductor system 41 are as follows.

Upon receiving a command from the user, the system agent 42 may store an application code in the data storage region 431 of the system memory 43. The CPU bodies 411a and 411b may store some parts of the application code in the LLC 413, and may store a portion of the stored application code parts in the L1/L2 caches 412a and 412b. The CPU body 411a may receive a necessary application code from the L1/L2 cache 412a, and the CPU body 411b may receive a necessary application code from the L1/L2 cache 412b, such that the CPU bodies 411a and 411b may perform calculation using the received application codes.

When image calculation is needed, the system agent 42 may store a GPU calculation command in the data storage region 431 of the system memory 43. The GPU calculation command stored in the system memory 43 may be transmitted to the GPU 45 after passing through the image input device 44 along the loop-shaped transmission line La, and may then be stored in the LLC 452. The GPU body 451 may construct a primitive data storage for storing primitive data, a rendered data storage for storing rendered data, and a frame buffer for storing frame buffer data in the data storage region 431 of the system memory 43 along the loop-shaped transmission line La, and may then perform image calculation using the constructed storages. The completely-processed image data may be stored in the frame buffer. The system agent 42 may read frame buffer data stored in the frame buffer, and may transmit the read frame buffer data to the display controller 461. The display controller 461 may output frame buffer data to the display device 462.

The ISP 442 of the image input device 44 may allow CIS data received from the CIS 441 to pass through the GPU 45 along the loop-shaped transmission line (La), and may store the resultant CIS data in a CIS data storage of the data storage region 431 of the system memory 43. The calculation logic circuit (CAL) 431 of the system memory 43 may compress image data received from the image data input circuit 45, and may store the compressed image data in the data storage region 451. The GPU 45 may receive CIS data stored in the CIS data storage along the loop-shaped transmission line La, and may process the received CIS data. In this case, the image data is compressed and stored, resulting in reduction of the amount of transmission data on the transmission line La. In accordance with one embodiment, the CAL 432 of the system memory 43 may perform some parts of image calculation to be performed by the GPU 45. In this case, load of the GPU 45 may be reduced.

In accordance with one embodiment, the CPU 41, the system memory 43, and the image output device 46 may be coupled to the system agent 42. The system memory 43, the image input device 44, and the GPU 45 may be interconnected through the transmission line La in the form of a loop shape. Accordingly, the image input device 44 and the GPU 45 may be coupled to the system memory 43 without passing through the system agent 42, such that load of the system agent 42 is reduced, resulting in improvement of overall system performance.

FIGS. 5 to 8 are schematic diagrams illustrating representations of examples of semiconductor systems according to an embodiment of the present disclosure. The semiconductor systems shown in FIGS. 5 to 8 may be obtained by modification of some structures of the semiconductor system of FIG. 4.

Figure 5:
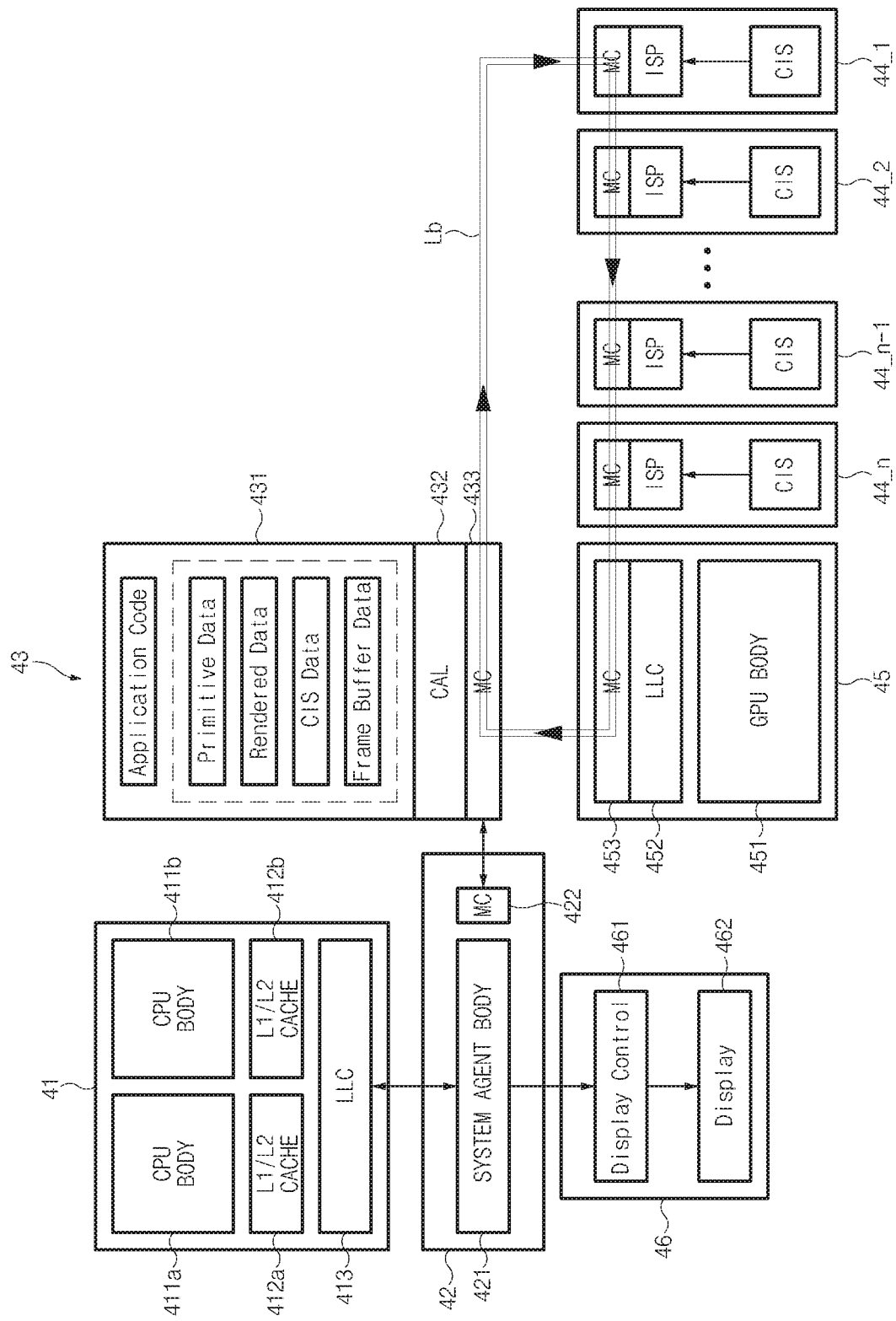

Referring to FIG. 5, the semiconductor system may include a plurality of image input devices 44_1 to 44_$n$. The system memory 43, the plurality of image input devices 44_1 to 44_$n$, and the GPU 45 may be coupled to one another through the transmission line Lb in the form of a loop shape. The CPU 41, the system agent 42, the system memory 43, the GPU 45, and the image output device 46 of FIG. 5 may be identical to those of FIG. 4, and as such a detailed description thereof will herein be omitted for convenience of description and better understanding of the present disclosure.

The respective structures of the image input devices 44_1 to 44_$n$ may correspond to the image input device 44 of FIG. 4. However, image data received from the image input device 44_1 may be stored in the system memory 43 after passing through the image input devices 44_2 to 44_$n$ and the GPU 45. Image data received from the image input device 44_2 may be stored in the system memory 43 after passing through the image input devices 44_3 to 44_$n$ and the GPU 45 through the transmission line Lb. Image data received from the image input device (44_$k$, where 1≤k≤n-1) may be stored in the system memory 43 after passing through the image input devices 44_$k$+1 to 44_$n$ and the GPU 45 along the transmission line Lb. Image data received through the image input device 44_$n$ may be stored in the system memory 43 after passing through the GPU 45 along the transmission line Lb.

The GPU 45 may receive image data stored in the system memory 43 through the image input devices 44_1 to 44_$n$ so as to perform image data processing.

Figure 6:
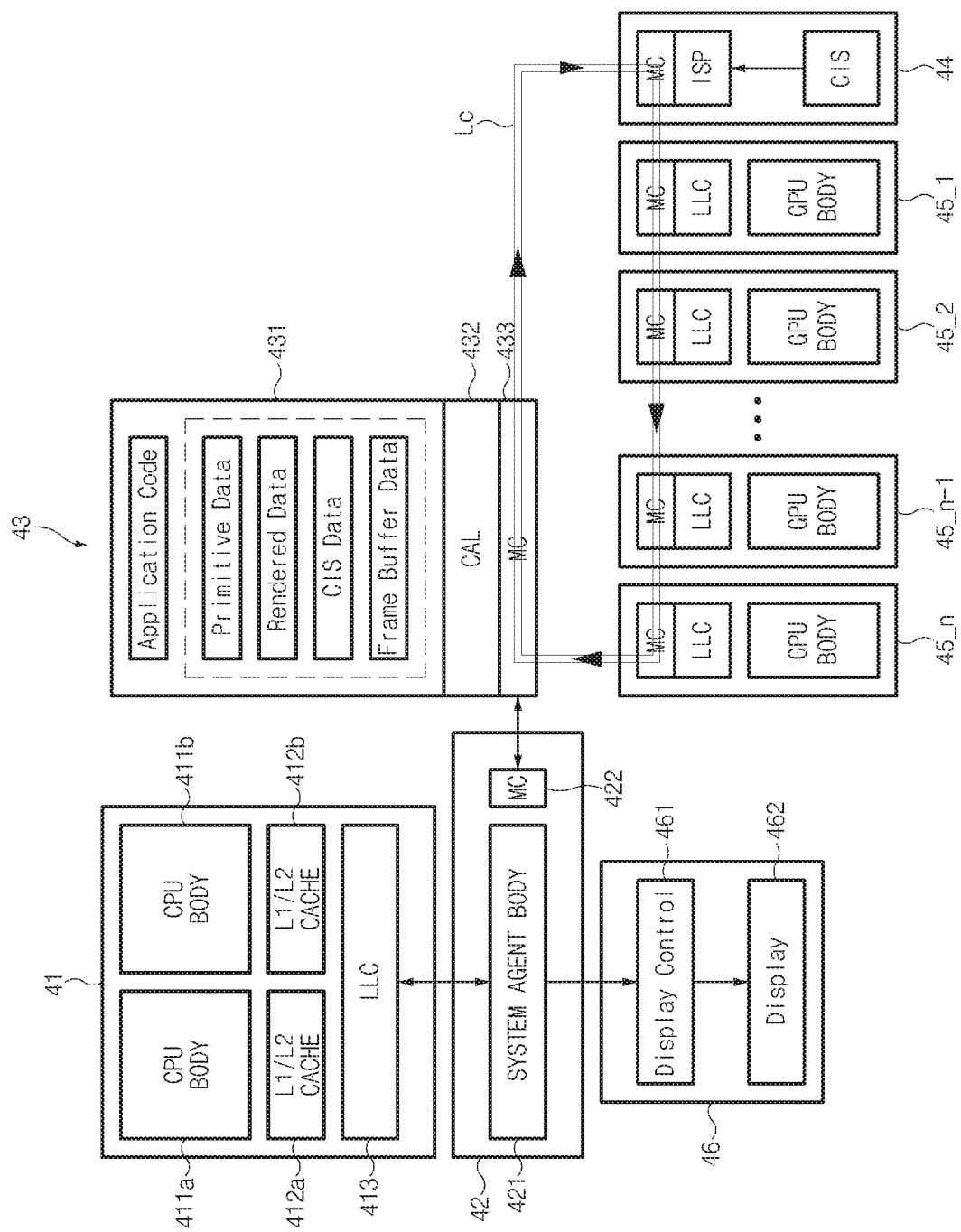

Referring to FIG. 6, the semiconductor system may include a plurality of GPUs 45_1 to 45_$n$. The system memory 43, the image input device 44, and the plurality of GPUs 45_1 to 45_$n$ may be coupled to one another through the transmission line Lc in the form of a loop shape. The CPU 41, the system agent 42, the system memory 43, the image input device 44, and the image output device 46 of FIG. 6 are identical to those of FIG. 4, and as such a detailed description thereof will herein be omitted for convenience of description.

The respective structures of the GPUs 45_1 to 45_$n$ may correspond to the GPU 45 of FIG. 4. However, data stored in the system memory 43 may be transmitted to the GPU 45_1 after passing through the image input device 44 along the transmission line Lc, and data processed by the GPU 45_1 may be stored in the system memory 43 after passing through the GPUs 45_2 to 45_$n$ through the transmission line Lc. In addition, data stored in the system memory 43 may be transmitted to the GPU 45_2 after passing through the image input device 44 and the GPU 45_1 along the transmission line Lc, and data processed by the GPU 45_2 may be stored in the system memory 43 after passing through the GPUs 45_3 to 45_$n$ along the transmission line Lc. Likewise, data stored in the system memory 43 may be transmitted to the GPU 45_$k$+1 after passing through the image input device 44 and the GPUs (45_1 to 45_$k$, where 1≤k≤n-2) along the transmission line Lc, and data processed by the GPU 45_$k$+1 may be stored in the system memory 43 after passing through the GPUs 45_$k$+2 to 45_$n$ along the transmission line Lc. In addition, data stored in the system memory 43 may be transmitted to the GPU 45_$n$ after passing through the image input device 44 and the GPUs 45_1 to 45_$n$-1 along the transmission line Lc, and data processed by the GPU 45_$n$ may be stored in the system memory 43 through the transmission line Lc.

Figure 7:
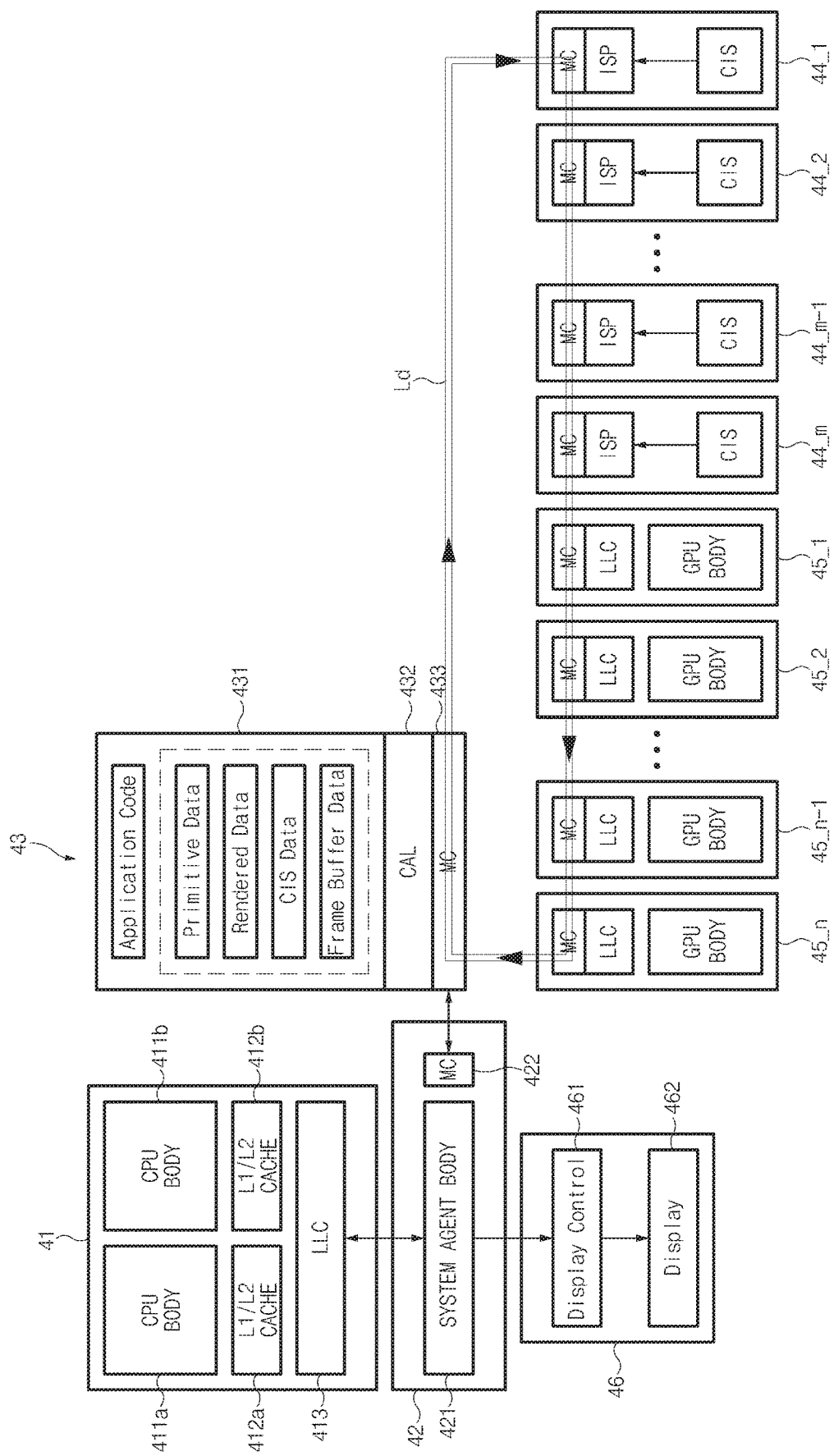

Referring to FIG. 7, the semiconductor system may include a plurality of image input devices 44_1 to 44_$m$ and a plurality of GPUs 45_1 to 45_$n$. The system memory 43, the plurality of image input devices 44_1 to 44_$m$, and a plurality of GPUs 45_1 to 45_$n$ may be coupled to one another through the transmission line Ld in the form of a loop shape. The CPU 41, the system agent 42, the system memory 43, the GPU 45, and the image output device 46 of FIG. 7 are identical to those of FIG. 4, and as such a detailed description thereof will herein be omitted for convenience of description.

In FIG. 7, CIS data received through any one of the image input devices 44_1 to 44_$m$ may be stored in the system memory 43 after passing through at least one left image input device (e.g., the image input device 44_1 may not pass through other image input devices) and the plurality of GPUs 45_1 to 45_$n$ in the arrow direction of FIG. 7. Image data processed by any one of the GPUs 45_1 to 45_$n$ may be stored in the system memory 43 after passing through at least one left GPU (e.g., the GPU 45_1 may not pass through other GPUs) in the arrow direction of FIG. 7. Data stored in the system memory 43 may be transmitted to any one of the GPUs 45_1 to 45_$n$ after passing through the plurality of image input devices 44_1 to 44_$m$ and at least one right GPU (e.g., the GPU 45_1 may not pass through other GPUs) in the arrow direction of FIG. 7.

Figure 8:
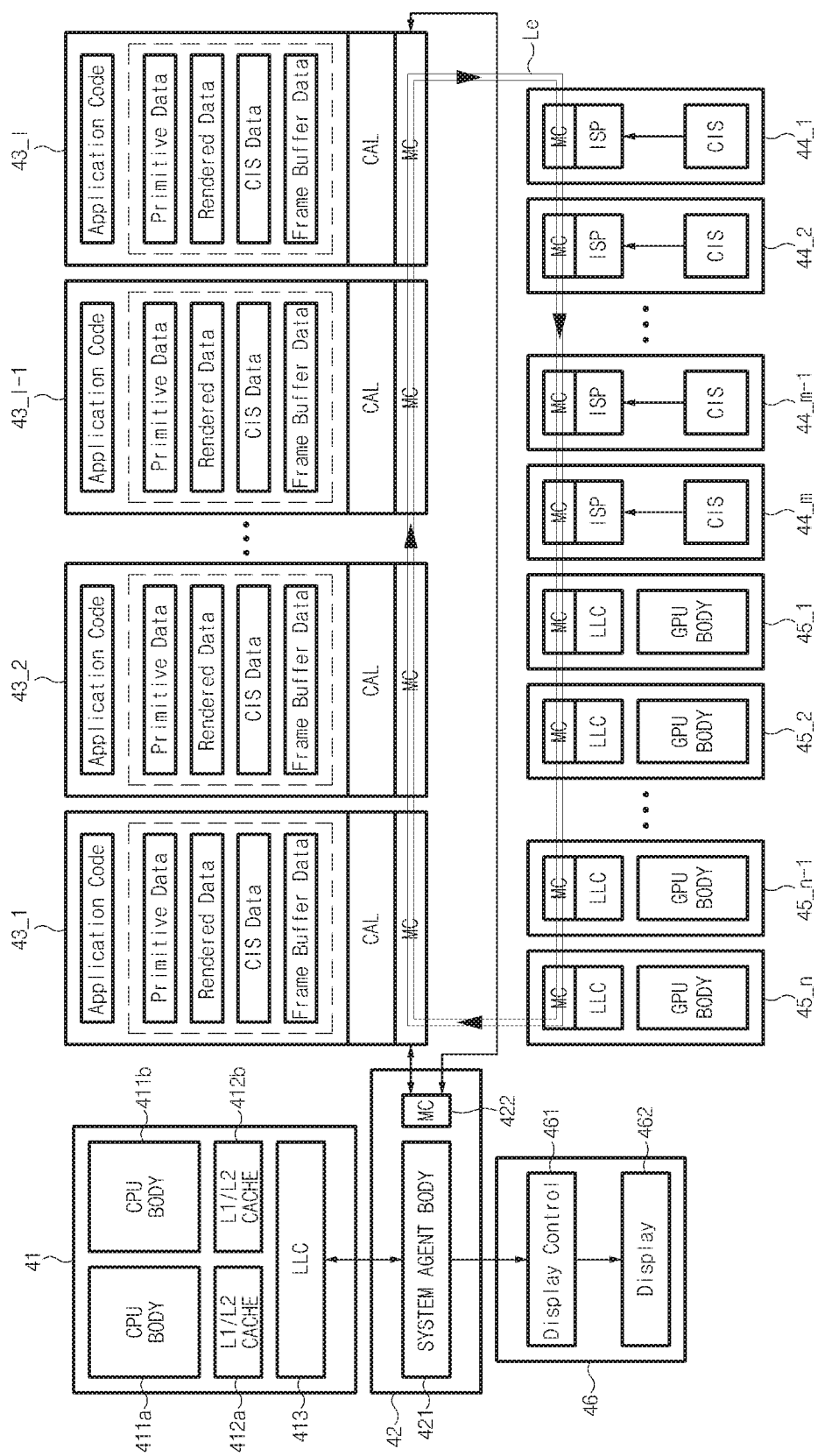

Referring to FIG. 8, the semiconductor system may include a plurality of system memories 43_1 to 43_$l$, a plurality of image input devices 44_1 to 44_$m$, and a plurality of GPUs 45_1 to 45_$n$. The plurality of system memories 43_1 to 43_$l$, the plurality of image input devices 44_1 to 44_$m$, and the plurality of GPUs 45_1 to 45_$n$ may be coupled to one another through the transmission line Le in the form of a loop shape. The CPU 41, the system agent 42, and the image output device 46 of FIG. 8 are identical to those of FIG. 4, and as such a detailed description thereof will herein be omitted for convenience of description.

A data transmission scheme for use in the loop formed by the plurality of system memories 43_1 to 43_$l$, the plurality of image input devices 44_1 to 44_$m$, and the plurality of GPUs 45_1 to 45_$n$ may be similar to those of FIGS. 4A to 4D. In more detail, in order to store CIS data received from any one of the plurality of image input devices 44_1 to 44_$m$ in any one of the plurality of system memories 43_1 to 43_$l$, the CIS data must pass through a plurality of devices disposed between a corresponding image input device and a corresponding system memory in the arrow direction. In order to transmit data from any one of the GPUs 45_1~45_$n$ to any one of the system memories 43_1~43_$l$, the data may pass through a plurality of devices disposed between a corresponding GPU and a corresponding system memory in the arrow direction.

Figure 9:
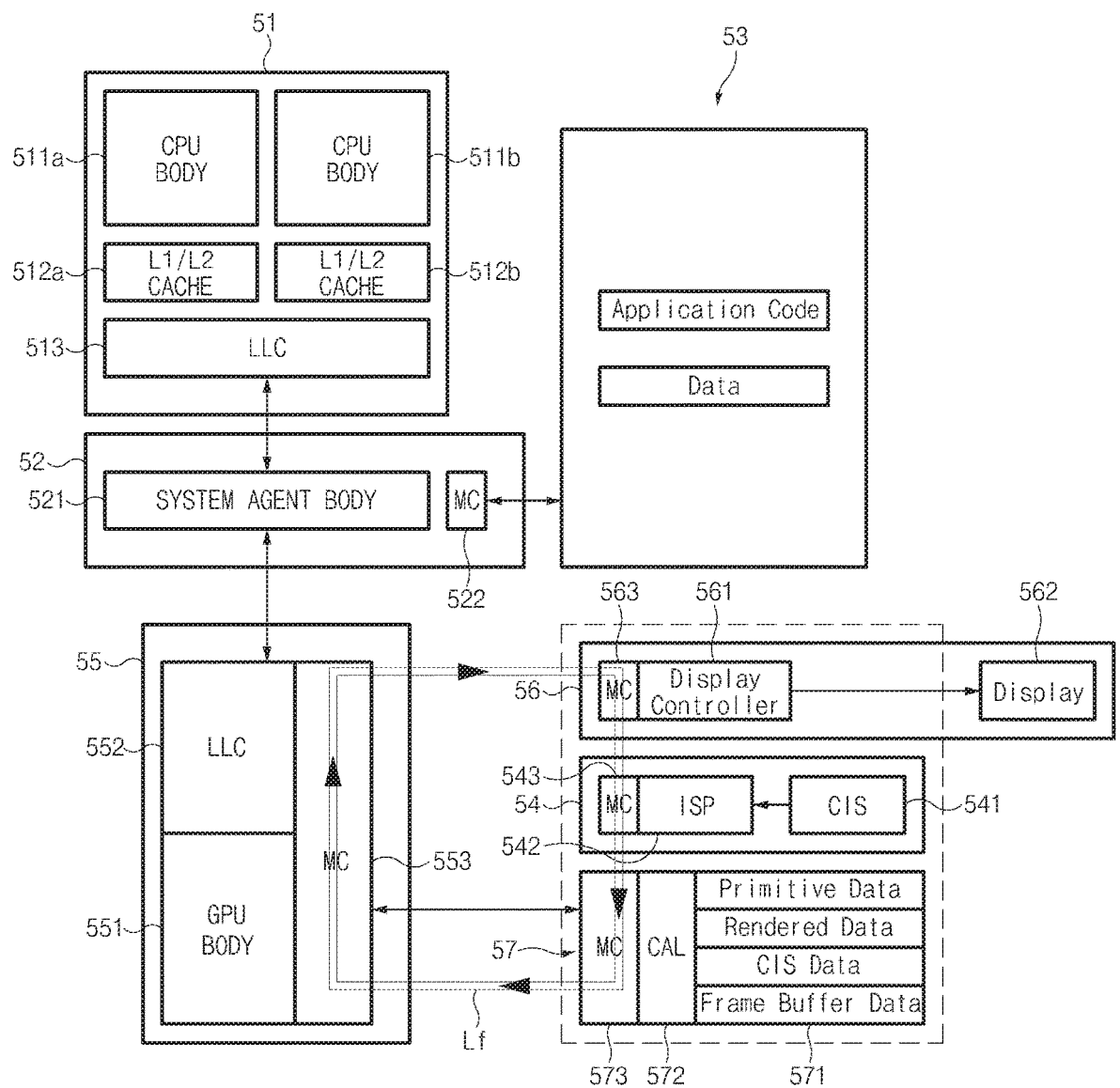
FIGS. 9 to 11 are schematic diagrams illustrating representation of examples of semiconductor systems according to an embodiment of the present disclosure.
Figure 10:
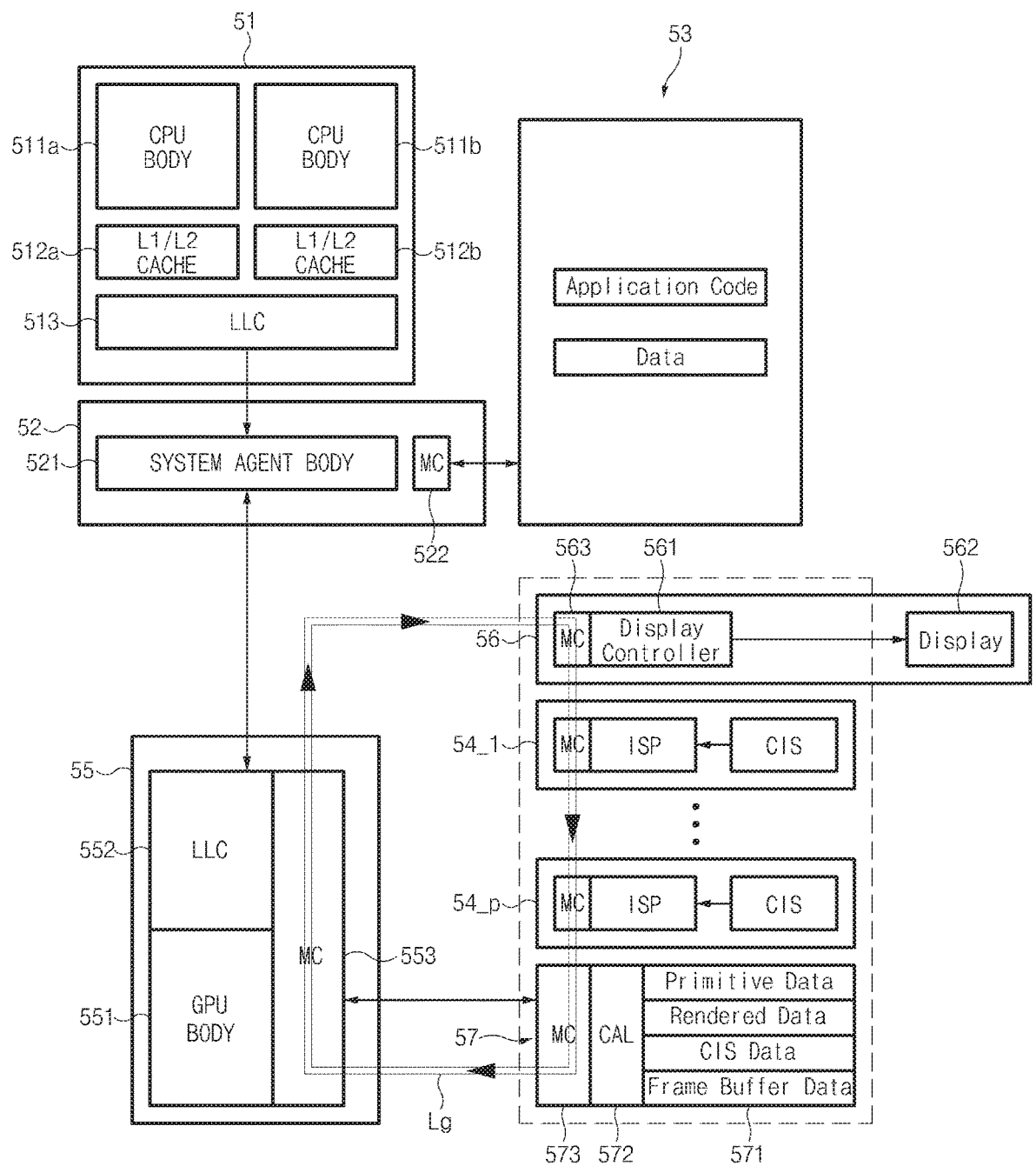
Figure 11:
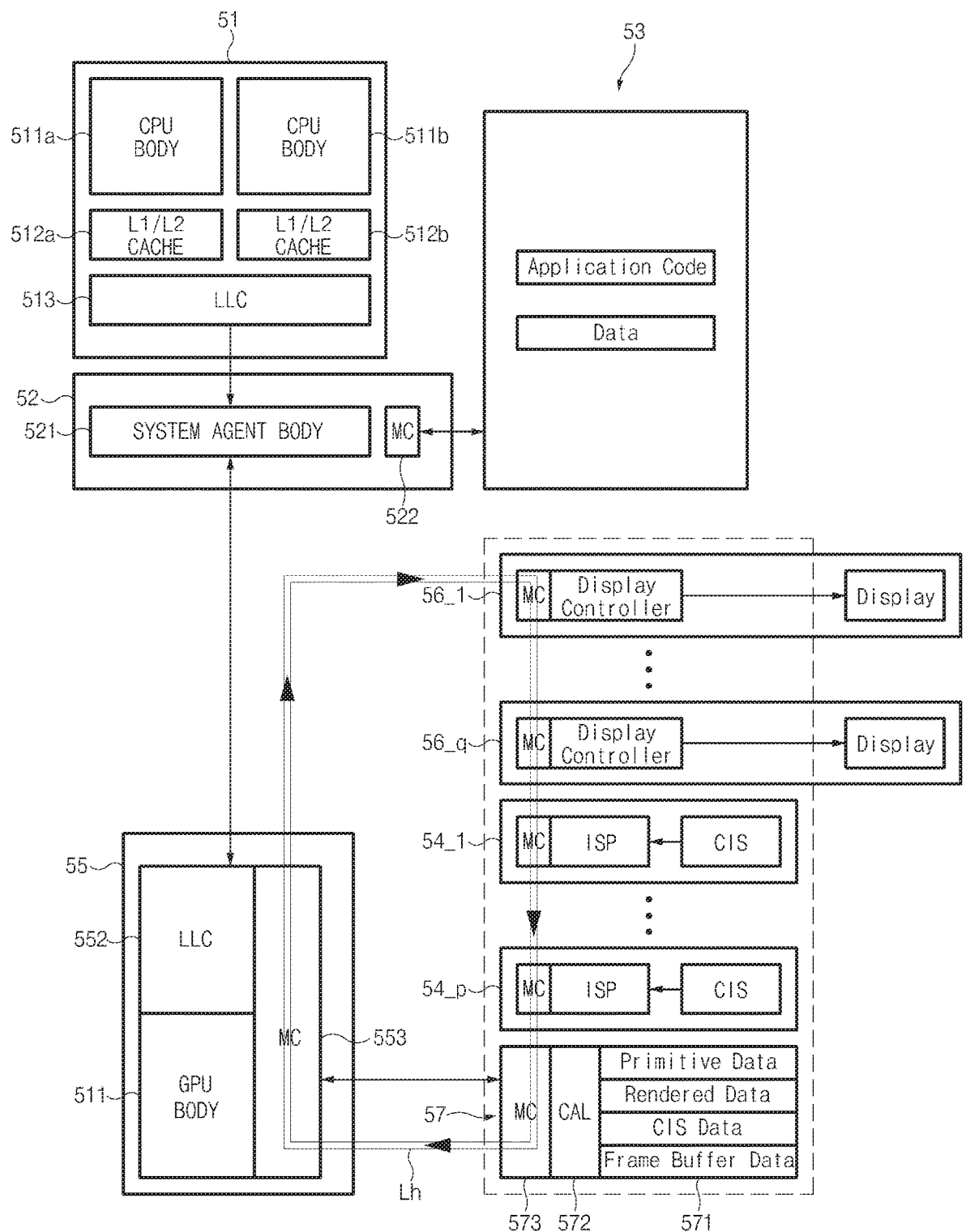

FIGS. 9 to 11 are schematic diagrams illustrating representation of examples of semiconductor systems according to an embodiment of the present disclosure. Only one transmission line Lf is exemplarily shown in FIG. 9, only one transmission line Lg is exemplarily shown in FIG. 10, and only one transmission line Lh is exemplarily shown in FIG. 11. Each transmission line Lf, Lg, or Lh may indicate a data transmission direction. Each transmission line Lf, Lg, or Lh may be composed of a plurality of segments so as to interconnect a plurality of devices in the form of a loop shape as shown in FIG. 1.

Referring to FIG. 9, the semiconductor system may include a CPU 51, a system agent 52, a system memory 53, an image input device 54, a GPU 55, an image output device 56, and a graphics memory 57. In FIG. 9, the first semiconductor device 10 of FIG. 1 may correspond to the graphics memory 57, the second semiconductor device 20 of FIG. 1 may correspond to the image output device 56, and the third semiconductor device 30 of FIG. 1 may correspond to the image input device 54. In FIG. 9, the same constituent elements as in FIG. 4 will herein be omitted for convenience of description.

The CPU 51 may correspond to the CPU 41 of FIG. 4, and as such a detailed description thereof will herein be omitted for convenience of description.

The system agent 52 may correspond to the system agent 42 of FIG. 4, may be coupled to the CPU 51, the system memory 53, and the GPU 55, such that the system agent 52 may control data communication among the CPU 51, the system memory 53, and the GPU 55.

The system memory 53 may be coupled to the memory controller 532 of the system agent 52. The system memory 53 may store an application code and data needed for system calculation.

The graphics memory 57 may correspond to the first semiconductor device 10 of FIG. 1, and may store data associated with the image calculation operation of the GPU 55. The graphics memory 57 may be implemented as a High Bandwidth Memory (HBM). The graphics memory 57 may be coupled to the image output device 56 and the image input device 54 through the transmission line (Lf) in the form of a loop shape. The graphics memory 57 may include a data storage region 571, a calculation logic circuit (CAL) 572, and a memory controller 573. The data storage region 571 may store primitive data for image processing in the GPU 55, rendered data, CIS data, and frame buffer data. The CAL 572 may perform calculation operation (e.g., compression operation) for data received through the memory controller (MC) 573, and may store the calculated (or compressed) data in the data storage region 571. In accordance with one embodiment, the CAL 572 may also perform some parts of the image calculation operation of the GPU 55. The memory controller (MC) 573 may communicate with the memory controller (MC) 553 of the GPU 55. In addition, the memory controller (MC) 573 may receive packet-shaped data from the memory controller (MC) 543 of the image input device 54, and may transmit the received data to the image output device 56 according to destination information contained in the packet. The memory controller 573 may include a receiver 100, a destination decision circuit 110, an internal packet generation circuit 130, a selection signal generation circuit 140, a packet selection circuit 150, and a transmitter 160. The CAL 572 and/or the data storage region 571 may correspond to the data processor 120 of FIG. 2.

The image output device 56 may correspond to the second semiconductor device 20 of FIG. 1, and may be coupled to the image input device 54 and the graphics memory 57 through the transmission line Lf in the form of a loop shape. The image output device 56 may include a display controller 561, a display device 562, and a memory controller 563. The memory controller (MC) 563 may receive packet-shaped data from the memory controller (MC) 573 of the graphics memory 57, and may transmit the received data to the image input device 54 according to destination information contained in the packet. The memory controller (MC) 563 may include a receiver 100, a destination decision circuit 110, an internal packet generation circuit 130, a selection signal generation circuit 140, a packet selection circuit 150, and a transmitter 150 of FIG. 2. The display controller 561 may correspond to the data processor 120 of FIG. 2.

The image input device 54 may correspond to the third semiconductor device 30 of FIG. 1, and may be coupled to the graphics memory 57 and the image output device 56 through the transmission line (Lf) in the form of a loop shape. The image input device 54 may include a CIS 541, an ISP 542, and a memory controller (MC) 543. The memory controller (MC) 543 may receive packet-shaped data from the memory controller (MC) 563 of the image output device 56, and may transmit the received data to the graphics memory 57 according to destination information contained in the packet. The memory controller (MC) 543 may include a receiver 100, a destination decision circuit 110, an internal packet generation circuit 130, a selection signal generation circuit 140, a packet selection circuit 150, and a transmitter 160 of FIG. 2. The ISP 542 may correspond to the data processor 120 of FIG. 2.

The GPU 55 may include a GPU body 551, an LLC 552, and a memory controller (MC) 553. The GPU body 551 may perform calculation related to image processing. The LLC 552 may store some parts of the application code needed to operate the GPU body 551. The memory controller 553 may control data communication between the GPU body 551 and the graphics memory 57.

The operations of the semiconductor system will hereinafter be described in detail.

Upon receiving a command from the user, the system agent 52 may store an application code in the system memory 53. The CPU bodies 511a and 511b may store some parts of the application code needed for calculation in the LLC 513, and may store some parts of the stored application code parts in the L1/L2 caches 512a and 512b. The CPU body 511a may read a necessary application code from the L1/L2 cache 512a, and the CPU body 511b may read a necessary application code from the L1/L2 cache 512b, such that the CPU bodies 511a and 511b may perform calculation using the received application codes.

When image calculation is needed, the system agent 52 may store a GPU calculation command stored in the system memory 53 in the LLC 552 of the GPU 55. The GPU body 551 may construct a primitive data storage for storing primitive data, a rendered data storage for storing rendered data, and a frame buffer for storing frame buffer data in the data storage region 571 of the system memory 57, and may then perform image calculation using the constructed storages. The completely-processed image data may be stored in the frame buffer. The frame buffer data stored in the frame buffer may be constructed in the form of a packet, and may then be transmitted to the image output device 56 along the transmission line Lf. The memory controller 563 of the image output device 56 may transmit the packet to the display controller 561, and the display controller 561 may output frame buffer data contained in the packet to the display device 562.

The ISP 542 of the image input device 54 may store CIS data received from the CIS 541 in the CIS data storage of the data storage region 571 of the graphics memory 57 along the transmission line Lf. The CAL 572 of the graphics memory 57 may compress CIS data received from the image data input circuit 54, and may store the compressed CIS data in the data storage region 571. The GPU 55 may receive image data stored in the CIS data storage, and may process the received image data. In this case, since image data is compressed and stored, the amount of data transmission on the transmission line Lf may be reduced.

The semiconductor systems will hereinafter be described with reference to FIGS. 10 and 11. The semiconductor systems may be obtained by modification of some structures of the semiconductor system of FIG. 9.

FIG. 10 is a schematic diagram illustrating a representation of an example of the semiconductor system according to an embodiment of the present disclosure.

Referring to FIG. 10, the semiconductor system may include a CPU 51, a system agent 52, a system memory 53, a plurality of image input devices 54_1 to 54_p, a GPU 55, an image output device 56, and a graphics memory 57. The GPU 55, the image output device 56, the plurality of image input devices 54_1 to 54_p, and the graphics memory 57 may be coupled to one another through the transmission line Lg in the form of a loop shape.

The memory controller 553 of the GPU 55 may receive packet-shaped data from the memory controller (MC) 573 of the graphics memory 57, and may transmit the received data to the image output device 56 according to destination information contained in the packet. The memory controller 553 may include a receiver 100, a destination decision circuit 110, an internal packet generation circuit 130, a selection signal generation circuit 140, a packet selection circuit 150, and a transmitter 160 illustrated in FIG. 2. The GPU body 551 may correspond to the data processor 120 of FIG. 2.

Image data generated from any one of the plurality of image input devices 54_1 to 54_p may be stored in the graphics memory 57 after passing through at least one of other image input devices located in a lower part of FIG. 10. However, image data generated from the image input device 54_p located at the lowest part of FIG. 10 may be stored in the graphics memory 57 without passing through other image input devices.

Image data stored in the graphics memory 57 may be transmitted to the GPU 55 through the transmission line Lg. In accordance with one embodiment, a transmission line for coupling the graphics memory 57 to the GPU 55 may be used, separately from the transmission line Lg. In this case, a bandwidth between the graphics memory 57 and the GPU 55 may be increased so that a data transfer rate may be increased. The image data processed by the GPU 55 may be transmitted or output to the image output device 56 along the arrow direction, and may be stored in the graphics memory 57 after passing through the image output device 56 and the plurality of image input devices 54_1 to 54_p.

FIG. 11 is a schematic diagram illustrating a representation of an example of the semiconductor system according to an embodiment of the present disclosure.

Referring to FIG. 11, the semiconductor system may include a system agent 52, a system memory 53, a plurality of image input devices 54_1 to 54_p, a GPU 55, a plurality of image output devices 56_1 to 56_q and a graphics memory 57. The GPU 55, the plurality of image output devices 56_1 to 56_q, the plurality of image input devices 54_1 to 54_p, and the graphics memory 57 may be coupled to one another through the transmission line Lh in the form of a loop shape.

Any one of the plurality of image output devices 56_1 to 56_q may receive frame buffer data stored in the graphics memory 57, after passing through the GPU 55 and at least one of other image output devices located at an upper part of FIG. 11 in the arrow direction. However, the image output device 56_1 located at the highest part of FIG. 11 may receive frame buffer data after passing through only the GPU 55.

Figure 12:
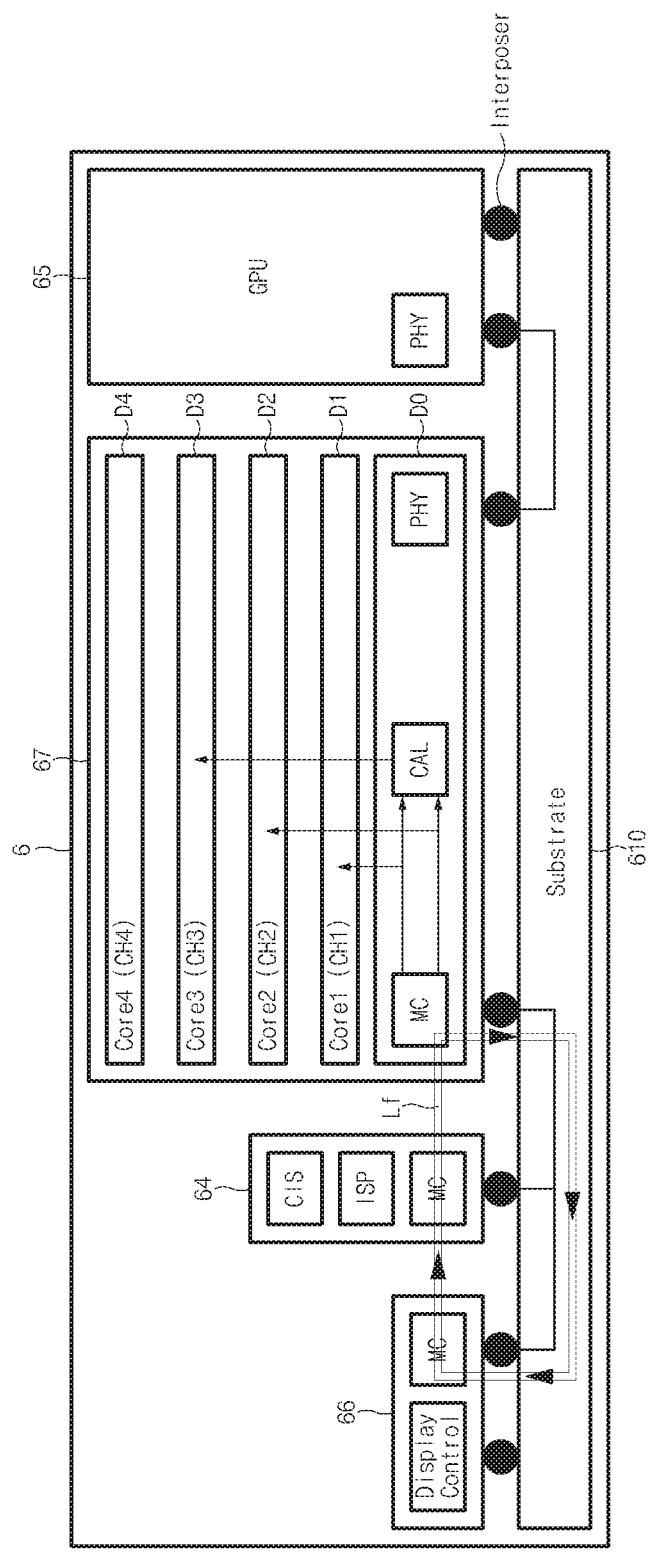
FIG. 12 is a schematic diagram illustrating a semiconductor system according to an embodiment of the present disclosure.

FIG. 12 is a schematic diagram illustrating a semiconductor system according to an embodiment of the present disclosure. FIG. 12 illustrates a System In Package (SIP) in which a dotted part of the semiconductor system of FIG. 9 and the GPU 55 are implemented as a single package.

Referring to FIG. 12, the semiconductor system 6 may include a substrate 610, a GPU 65, a graphics memory 67, an image output device 66, and an image input device 64. The GPU 65, the graphics memory 67, the image output device 66, and the image input device 64 may respectively correspond to the GPU 55, the graphics memory 57, the image output device 56, and the image input device 54 of FIG. 9.

The graphics memory 67 may include a stacked structure of a plurality of dies D0 to D4. The first die D0 may include a memory controller MC, a calculation logic circuit CAL, and a physical layer PHY. The memory controller MC and the CAL of the first die D0 may respectively correspond to the memory controller MC 573 and the CAL 572 of FIG. 9. The physical layer PHY may control data transmission along with the physical layer PHY of the GPU 65. The second to third dies D1 to D4 may correspond to the data storage region 571 of the graphics memory 57 shown in FIG. 9. The second to fifth dies D1, D2, D3, and D4 may respectively include a first core (Core1), a second core (Core2), a third core (Core3), and a fourth core (Core4). A first channel CH1, a second channel CH2, a third channel CH3, and a fourth channel CH4 may be respectively allocated to the first core (Core1), the second core (Core2), the third core (Core3), and the fourth core (Core4), and the respective channels (CH1~CH4) may be read or written independently from each other.

Each of the GPU 55, the graphics memory 57, the image output device 56, and the image input device 55 may be coupled to the substrate 610 through an interposer. The graphics memory 57, the image output device 56, and the image input device 55 may be coupled to one another through the transmission line Lf in the form of a loop shape. Although not shown in FIG. 12, the image output device 56 and the graphics memory 57 may be coupled to each other through the transmission line Lf. The GPU 55 and the graphics memory 57 may communicate with each other at high speed through each physical layer PHY.

Although the GPU 55 and the dotted part of FIG. 9 are implemented as a System In Package (SIP) for convenience of description and better understanding of the present disclosure, the scope or spirit of the present disclosure is not limited thereto. The GPU 55 and the dotted part of FIG. 10 may be implemented as a System In Package (SIP), or the GPU 55 and the dotted part of FIG. 11 may be implemented as a System In Package (SIP). In addition, the GPU 55 and the graphics memory 57 of FIG. 9 may be implemented as a first SIP, and the image output device 56 and the image input device 54 may be implemented as a second SIP, such that the first SIP and the second SIP may be respectively attached to a front surface and a rear surface of the substrate (e.g., PCB) as necessary.

Figure 13:
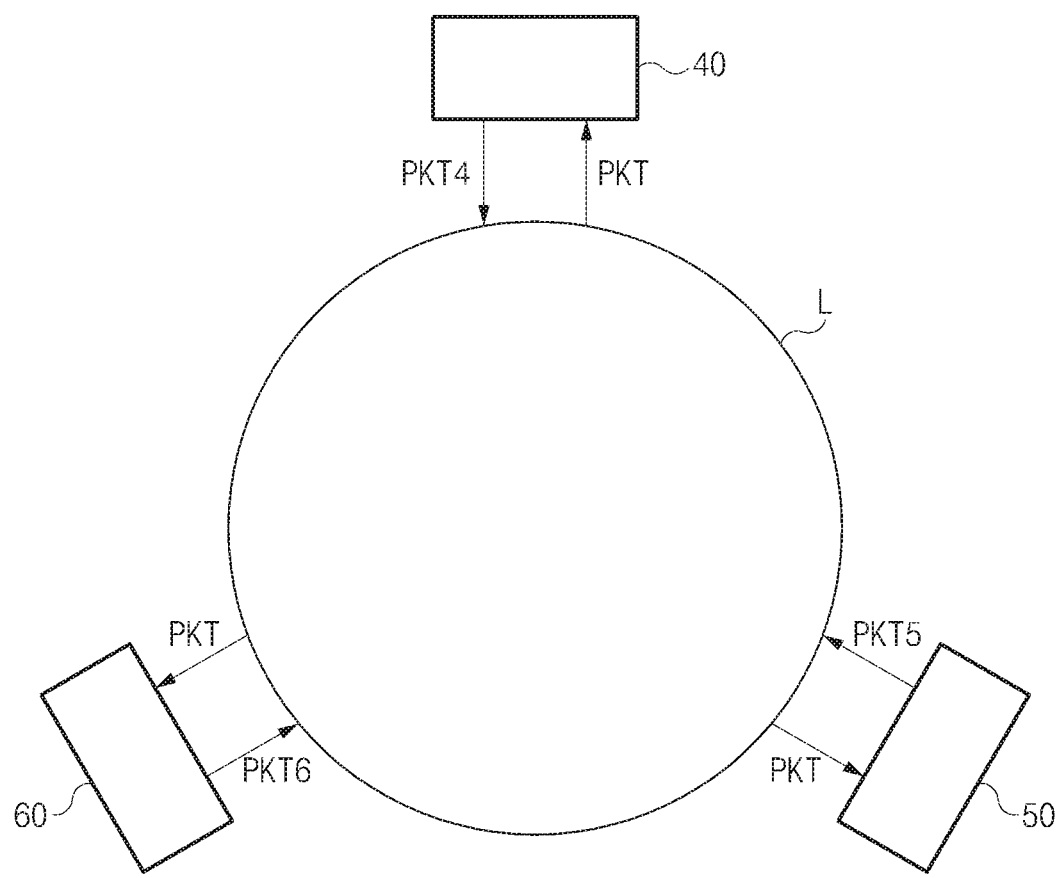
FIG. 13 is a conceptual diagram illustrating a representation of an example of a semiconductor system according to an embodiment of the present disclosure.

FIG. 13 is a conceptual diagram illustrating a representation of an example of a semiconductor system according to an embodiment of the present disclosure.

Referring to FIG. 13, the semiconductor system may include a loop-shaped transmission line L, and fourth to sixth semiconductor devices 40, 50, and 60 coupled to the transmission line L. Although FIG. 13 exemplarily discloses three semiconductor devices 40, 50, and 60 for convenience of description, the scope or spirit of the present disclosure is not limited thereto, and the semiconductor system of FIG. 13 may also include at least two semiconductor devices without departing from the scope or spirit of the present disclosure.

Each of the respective semiconductor devices 40, 50, and 60 may transmit data to the internal data processor on the basis of destination information of the packet (PKT) received from the transmission line L, or the semiconductor devices 40, 50, and 60 may respectively transmit the internal packets PKT4, PKT5, and PKT6 to the transmission line L.

Figure 14:
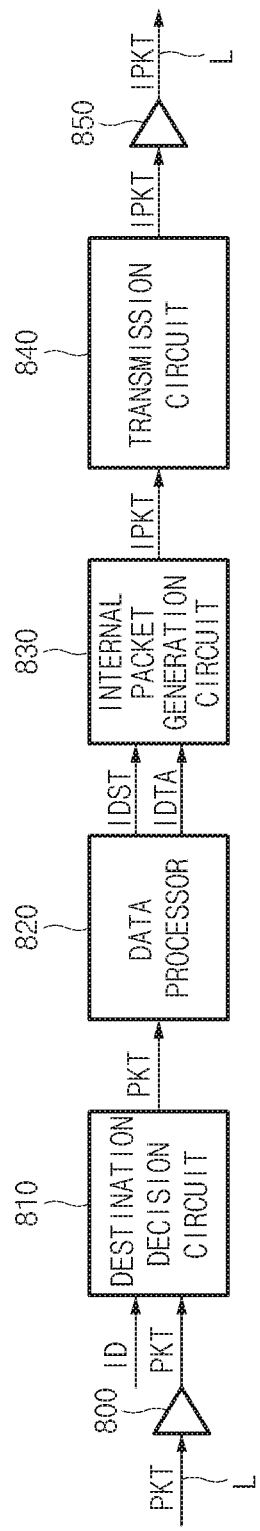
FIG. 14 is a block diagram illustrating a representation of an example of a semiconductor device according to an embodiment of the present disclosure.

FIG. 14 is a block diagram illustrating a representation of an example of a semiconductor device according to an embodiment of the present disclosure.

The semiconductor device may correspond to at least one of the fourth to sixth semiconductor devices 40, 50, and 60 shown in FIG. 13.

Referring to FIG. 14, the semiconductor device may include a receiver 800, a destination decision circuit 810, a data processor 820, an internal packet generation circuit 830, a transmission circuit 840, and a transmitter 850. In FIG. 14, the transmission line L may correspond to the loop-shaped transmission line (L) of FIG. 13.

The receiver 800 may detect the packet (PKT) on the transmission line L, and may transmit the detected packet (PKT) to the destination decision circuit 810.

The destination decision circuit 810 may transmit the packet (PKT) to the data processor 820 on the basis of destination information of the packet (PKT). The packet (PKT) may have the structure of the packet 3 shown in FIG. 3. The destination decision circuit 810 may compare destination information of the packet (PKT) with ID information of the semiconductor device. When the destination information of the packet (PKT) is identical to ID information of the semiconductor device, the destination decision circuit 810 may transmit the packet (PKT) to the data processor 820. When the destination information of the packet (PKT) is not identical to ID information of the semiconductor device, the destination decision circuit 810 may not transmit the packet (PKT) to the data processor 820.

The data processor 820 may process the packet (PKT). The data processor 820 may generate internal destination information (IDST) and internal data (IDTA). The internal destination information (IDST) and the internal data (IDTA) may be generated on the basis of the processing result of the packet (PKT), and may also be generated irrespective of the packet (PKT).

The internal packet generation circuit 830 may generate the internal packet (IPKT) using the internal destination information (IDST) and the internal data (IDTA). The internal packet (IPKT) may have the structure of the packet 3 shown in FIG. 3. The internal packet (IPKT) may correspond to one of the packets (PKT4~PKT6) of FIG. 13.

The transmission circuit 840 may transmit the internal packet (IPKT) to the transmission line L. The transmission circuit 840 may detect the presence or absence of a standby state of the transmission line L, and may transmit the internal packet (IPKT) to the transmission line L according to the result of detection. For example, when a voltage of the transmission line L is equal to or higher than a predetermined level, this means that the transmission line L is currently used and enters a standby mode. When the voltage of the transmission line L is less than the predetermined level, this means that the transmission line L is in the standby mode such that the transmission line L may transmit the internal packet (IPKT). The transmission circuit 840 may detect the voltage of the transmission line L at intervals of a predetermined time.

The transmitter 850 may transmit the internal packet (IPKT) received from the transmission circuit 840 to the transmission line L.

Figure 15:
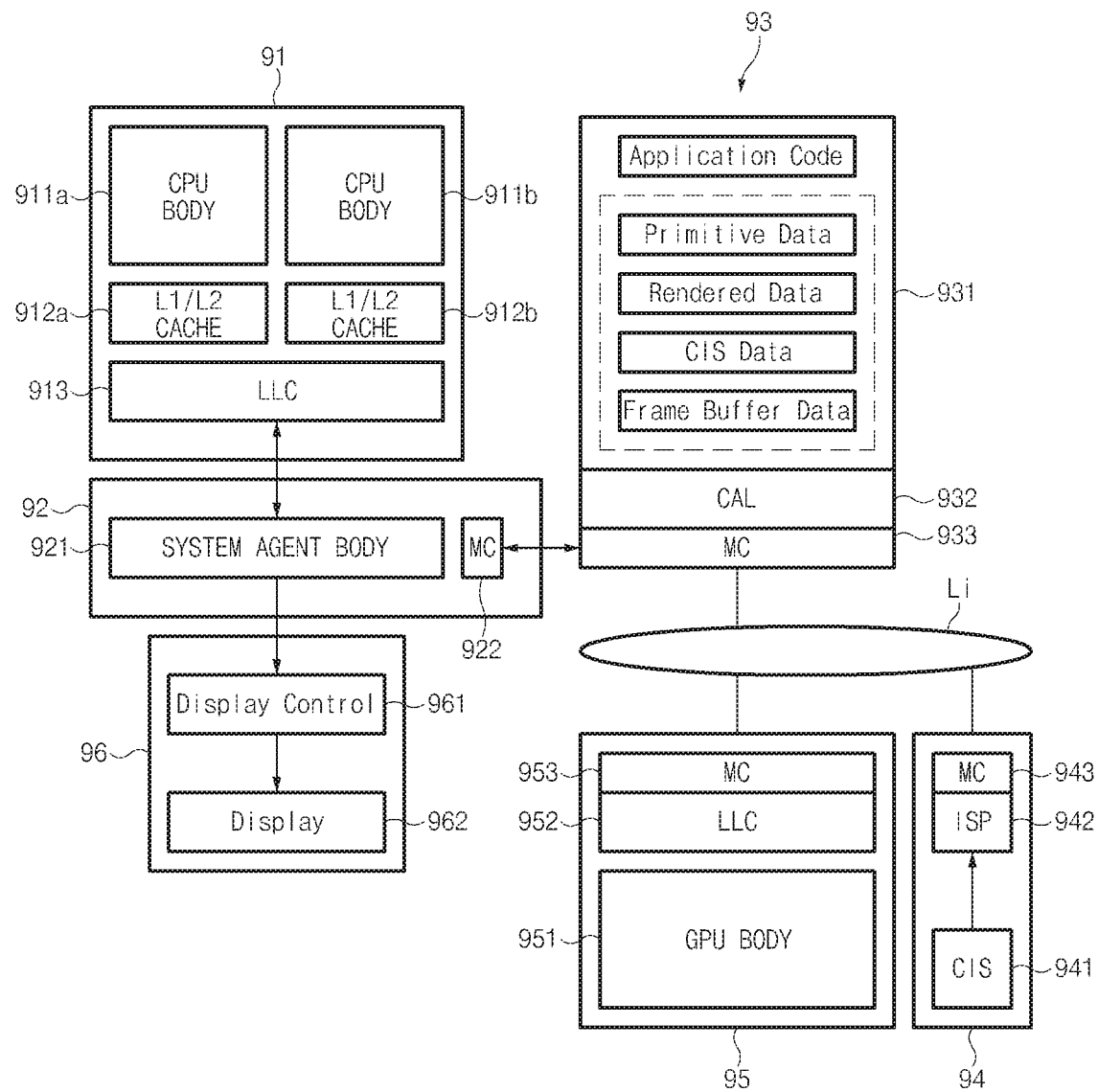
FIG. 15 is a block diagram illustrating a representation of an example of a semiconductor system according to an embodiment of the present disclosure.

FIG. 15 is a block diagram illustrating a representation of an example of a semiconductor system according to an embodiment of the present disclosure.

The semiconductor system of FIG. 15 may correspond to the semiconductor system of FIG. 4. Whereas the system memory 43, the image input device 44, and the GPU 45 of FIG. 4 are coupled to one another through the transmission line La in the form of a loop shape, the semiconductor system may enables a system memory 93, an image input device 94, and a GPU 95 to be coupled to the loop-shaped transmission line L1.

The system memory 93, the image input device 94, and the GPU 95 may respectively correspond to the fourth semiconductor device 40, the fifth semiconductor device 50, and the sixth semiconductor device 60 of FIG. 13. Each of an MC 933 of the system memory 93, an MC 943 of the image input device 94, and an MC 953 of the GPU 95 may include a receiver 800, a destination decision circuit 810, an internal packet generation circuit 830, a transmission circuit 840, and a transmitter 850 of FIG. 14. A CAL 932 and/or a data storage region 931 of the system memory 93, an ISP 942 of the image input device 94, a GPU body 951 and/or an LLC 952 of the GPU 95 may correspond to the data processor 820 of FIG. 14.

The basic operations of the above-mentioned constituent elements are identical to those of the semiconductor system of FIG. 4. However, data communication between the system memory 93, the image input device 94, and the GPU 95 may be achieved through the loop-shaped transmission line (L1) as shown in FIGS. 13 and 14.

Figure 16:
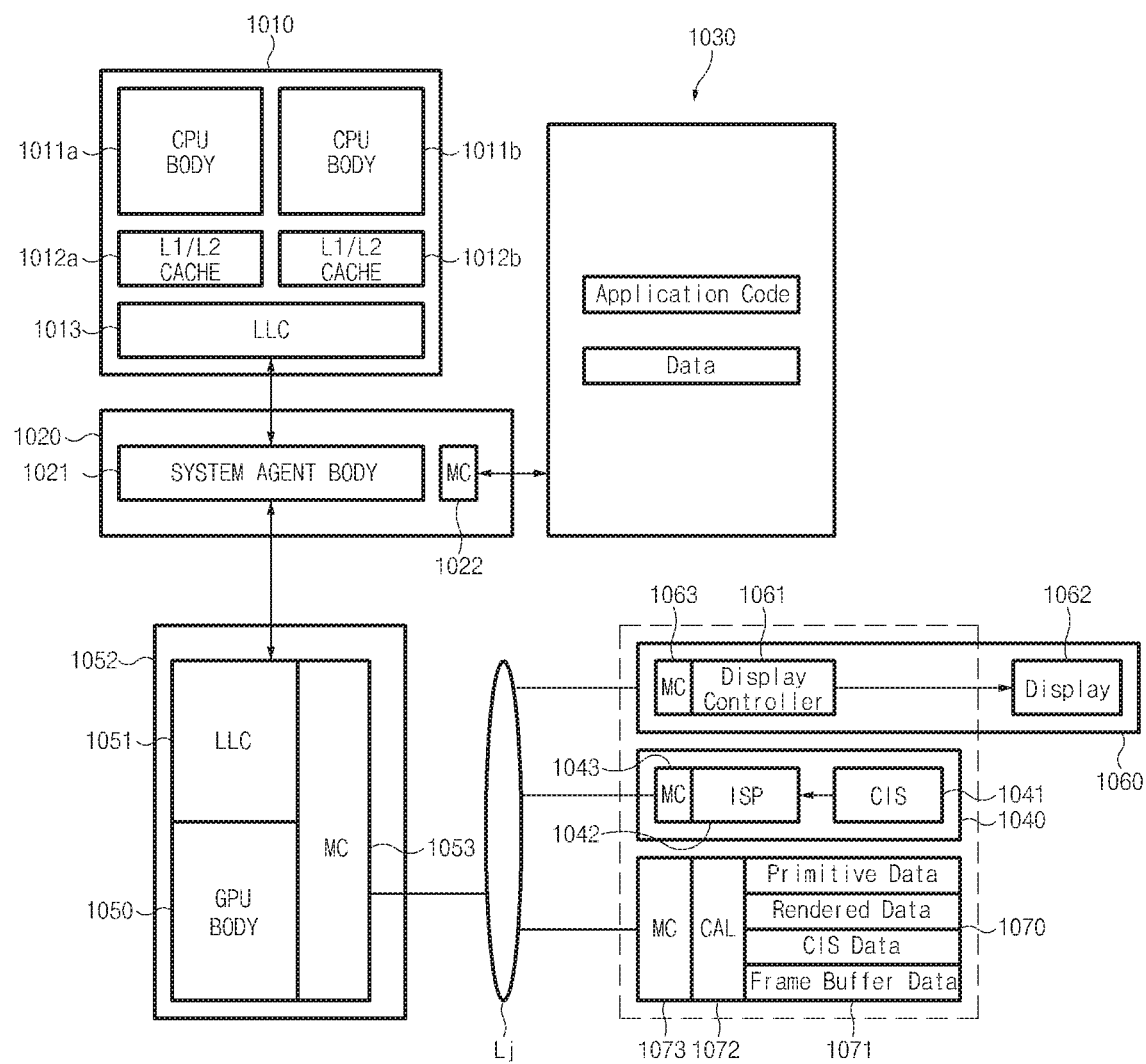
FIG. 16 is a block diagram illustrating a representation of an example of a semiconductor system according to an embodiment of the present disclosure.

FIG. 16 is a block diagram illustrating a representation of an example of a semiconductor system according to an embodiment of the present disclosure. The semiconductor system of FIG. 16 may correspond to the semiconductor system of FIG. 9. Whereas the graphics memory 57, the image output device 56, and the image input device 54 of FIG. 9 are coupled to one another through the transmission line Lf in the form of a loop shape, the semiconductor system may enables a graphics memory 1070, an image output device 1060, and an image input device 1040 to be coupled to the loop-shaped transmission line Lj.

The graphics memory 1070, the image output device 1060, and the image input device 1040 may respectively correspond to the fourth semiconductor device 40, the fifth semiconductor device 50, and the sixth semiconductor device 60 of FIG. 13. Each of an MC 1073 of the graphics memory 1070, an MC 1063 of the image output device 1060, and an MC 1043 of the image input device 1040 may include a receiver 800, a destination decision circuit 810, an internal packet generation circuit 830, a transmission circuit 840, and a transmitter 850 of FIG. 14. A CAL 1072 and/or a data storage region 1071 of the graphics memory 1070, a display controller 1061 of the image output device 1060, and an ISP 1042 of the image input device 1040 may correspond to the data processor 820 of FIG. 14.

The basic operations of the above-mentioned constituent elements are identical to those of the semiconductor system of FIG. 9. However, data communication between the graphics memory 1070, the image output device 1060, and the image input device 1040 may be achieved through the loop-shaped transmission line (Lj) as shown in FIGS. 13 and 14.

Although FIGS. 15 and 16 have been exemplarily disclosed as examples of the semiconductor system, the scope or spirit of the present disclosure is not limited thereto. For example, as shown in FIGS. 5 to 6, the semiconductor system according to the embodiment of the present disclosure may include multiple system memories or multiple image input devices or multiple GPUs. At least one system memory, at least one image input device, and at least one GPU may be coupled to the loop-shaped transmission line.

Referring to FIGS. 10 and 11, the semiconductor system according to an embodiment may include a graphics memory, a GPU, at least one image output device, and at least one image input device. The graphics memory, the GPU, the at least one image output device, and the at least one image input device may be coupled to the loop-shaped transmission line.

When the same kinds of devices (for example, the plurality of image input devices, the plurality of GPUs, the plurality of system memories, and the plurality of image output devices) are used as shown in FIGS. 5 to 8, 10, and 11, FIGS. 5 to 8, 10, and 11 have exemplarily disclosed that the same kinds of devices are coupled contiguous to one another. However, the scope or spirit of the present disclosure is not limited thereto, and the same kinds of devices may be located contiguous to one another or may also be arranged with a different type of device interposed therebetween.

Those skilled in the art will appreciate that the invention may be carried out in other specific ways than those set forth herein without departing from the spirit and essential characteristics of the invention. The above embodiments are therefore to be construed in all aspects as illustrative and not restrictive. The scope of the invention should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment of the invention or included as a new claim by a subsequent amendment after the application is filed.

INDUSTRIAL APPLICABILITY

The embodiments of the present disclosure may easily increase the number of semiconductor devices contained in the semiconductor system, resulting in increase extensibility.

The invention claimed is:

1. A semiconductor system comprising:
a memory connected to a first transmission line and a second transmission line, and configured to store first data received through the first transmission line and second data received through the second transmission line;
a central processor configured to perform system calculation using an application code stored in the memory;
a system agent connected to the first transmission line for communicating with the memory, and configured to control data communication between the central processor and the memory;
an image input device connected to the second transmission line, and configured to receive the image data from an external part and output the received image data to the second transmission line as the second data; and
a graphic processor connected to the second transmission line, and configured to process the image data received through the second transmission line,
wherein the first transmission line is a transmission line for bidirectional communication between the system agent and the memory, and the second transmission line is a loop-shape transmission line to form a ring network topology for interconnecting the memory, the image input device and the graphic processor.

2. The semiconductor system according to claim 1, wherein the memory includes:
a first destination decision circuit configured to transmit a first packet including the image data to the second transmission line on the basis of the result of comparison between first destination information of the first packet and identification (ID) information of the memory.

3. The semiconductor system according to claim 2, wherein the memory further includes:
a first data processor,
wherein, when the first destination information is identical to ID information of the memory, the first destination decision circuit transmits the first packet to the first data processor.

4. The semiconductor system according to claim 1, wherein the memory includes:
a first internal packet generation circuit configured to generate an internal packet having internal destination information and internal data; and
a first packet selection circuit configured to select any one of the first packet and the internal packet, and transmit the selected packet to the second transmission line.

5. The semiconductor system according to claim 4, wherein the memory further includes:
a first selection signal generation circuit configured to activate a selection signal upon receiving the first packet.

6. The semiconductor system according to claim 5, wherein the first packet selection circuit selects the first packet when the selection signal is activated.

7. The semiconductor system according to claim 1, further comprising:
an image output device coupled to the system agent through a third transmission line and configured to display the image data,
wherein the third transmission line is a point to point transmission line.

8. The semiconductor system according to claim 1, wherein the memory includes:
a data storage region configured to store the application code and the image data,
a calculation logic circuit configured to perform data compression of input data, and
a memory controller coupled to the first transmission line and the second transmission line to transmit or receive data, and configured to transmit data received through the first transmission line and the second transmission line to the calculation logic circuit and store compressed data by the calculation logic circuit in the data storage region.

9. A semiconductor system comprising:
a graphics memory connected to a first transmission line and a second transmission line, and configured to store first image data received through the first transmission line and second image data received through the second transmission line;

a graphics processor connected to the first transmission line for communicating with the memory through the first transmission line, and configured to process the first image data received through the first transmission line;

an image input device connected to the second transmission line, and configured to receive image data from an external part and output the received image data to the second transmission line as the second image data; and an image output device connected to the second transmission line, and configured to display the second image data, wherein the first transmission line is a transmission line for bidirectional communication between the graphics processor and the graphics memory, and the second transmission line is a loop-shape transmission line to form a ring network topology for interconnecting the graphics memory, the image input device and the image output device, and the graphics memory, the graphics processor, the image input device and the image output device are grouped into one package.

10. The semiconductor system according to claim 9, wherein the graphics memory includes:

a physical layer coupled to the first transmission line, and configured to receive or transmit the first image data through the first transmission line, and a memory controller coupled to the second transmission line, and configured to receive or transmit the second image data through the second transmission line.

* * * * *